United States Patent
Stojkovic et al.

(10) Patent No.: US 11,879,836 B2
(45) Date of Patent: Jan. 23, 2024

(54) COMPENSATION OF TEMPERATURE EFFECTS IN A SENSOR SYSTEM

(71) Applicant: ams Sensors Germany GmbH, Jena (DE)

(72) Inventors: Dalibor Stojkovic, Erfurt (DE); Predrag Micakovic, Erfurt (DE)

(73) Assignee: ams Sensors Germany GmbH, Jena (DE)

( * ) Notice: Subject to any disclaimer, the term of this patent is extended or adjusted under 35 U.S.C. 154(b) by 80 days.

(21) Appl. No.: 17/299,287

(22) PCT Filed: Nov. 25, 2019

(86) PCT No.: PCT/EP2019/082479
§ 371 (c)(1),
(2) Date: Jun. 2, 2021

(87) PCT Pub. No.: WO2020/135957
PCT Pub. Date: Jul. 2, 2020

(65) Prior Publication Data
US 2022/0057321 A1 Feb. 24, 2022

Related U.S. Application Data

(60) Provisional application No. 62/785,446, filed on Dec. 27, 2018.

(51) Int. Cl.
*G01N 21/35* (2014.01)
(52) U.S. Cl.
CPC ......... *G01N 21/35* (2013.01); *G01N 2201/02* (2013.01); *G01N 2201/062* (2013.01)
(58) Field of Classification Search
CPC ............... G01N 21/35; G01N 2201/02; G01N 2201/062; G01J 1/0252; G01J 3/50;
(Continued)

(56) References Cited

U.S. PATENT DOCUMENTS 5,154,889 A * 10/1992 Muraishi ............ G05D 23/1919
422/65
5,438,579 A * 8/1995 Eda ....................... H01S 5/0687
372/32
(Continued)

FOREIGN PATENT DOCUMENTS

CA 1333449 C 12/1994

OTHER PUBLICATIONS

International Search Report and Written Opinion for Application No. PCT/EP2019/082479 dated Feb. 26, 2020 (11 pages).
(Continued)

*Primary Examiner* — Marcus H Taningco
(74) *Attorney, Agent, or Firm* — Michael Best & Friedrich LLP

(57) ABSTRACT

Methods, systems, and apparatus, including computer programs encoded on a computer storage medium, for generating a first light wave by an emitter of the sensor system and detecting a second light wave by a detector of the sensor system. The second light wave is detected in response to the first light wave being reflected from a target object. The sensor system includes a first converter that obtains a first temperature measurement from a temperature sensor of the sensor system at least when the first light wave is generated or when the second light wave is detected. A temperature controller computes temperature coefficients to regulate a temperature of the sensor system. Each of the temperature coefficients are computed based on a difference between the first temperature and a reference temperature. The temperature controller generates a control signal to regulate the temperature of the sensor system based on the computed temperature coefficients.

18 Claims, 4 Drawing Sheets

(58) Field of Classification Search
CPC .. G01J 5/0096; G01J 5/06; G01J 5/064; G01J 3/0286
See application file for complete search history.

(56) References Cited

U.S. PATENT DOCUMENTS

| | | | | |
|---|---|---|---|---|
| 5,838,451 | A * | 11/1998 | McCarthy | G01J 3/10 356/402 |
| 6,155,712 | A * | 12/2000 | Egawa | G01J 5/10 374/126 |
| 2006/0281982 | A1 | 12/2006 | Grata et al. | |
| 2006/0292650 | A1 * | 12/2006 | Braig | C12Q 1/52 435/14 |
| 2010/0284005 | A1 * | 11/2010 | Malinen | G01J 3/02 356/326 |
| 2011/0288546 | A1 * | 11/2011 | Abbott | A61B 18/1445 606/41 |
| 2012/0140472 | A1 * | 6/2012 | Naegele | G01J 3/10 362/249.02 |
| 2013/0122607 | A1 * | 5/2013 | Kashiwazaki | G01N 21/77 422/69 |
| 2016/0377484 | A1 * | 12/2016 | Ott | H05B 45/18 315/151 |
| 2021/0405267 | A1 * | 12/2021 | Oteo | G02B 3/14 |

OTHER PUBLICATIONS

Keeping, "Smart Drivers Control LED Temperature to Solve SSL Thermal Issues", Digi-Key Electronics, <https://www.digikey.com/en/articles/techzone/2016/apr/smart-drivers-control-led-temperature-to-solve-ssl-thermal-issues>, Apr. 2016, 7 pages.

Yilmazer et al., "White Paper—Intelligent Over Temperature Protections for LED Lighting Applications", Infineon, <https://www.infineon.com/dgdl/IFX_Whitepaper_Intelligent+Over+Temperature+Protection+for+LED+Lighting+Applications.pdf?fileId=db3a304344d727a80144df6b18780bea>, Oct. 2013, 16 pages.

Malinen et al., "LED-based NIR spectrometer module for hand-held and process analyser applications", Sensors and Actuators B: Chemical, vol. 51, Issue 1-3, 1998, pp. 220-226.

* cited by examiner

COMPENSATION OF TEMPERATURE EFFECTS IN A SENSOR SYSTEM

FIELD

This specification relates to filters for optical sensing devices.

BACKGROUND

Integrated circuits (ICs) may include various components for use in sensing apparatus such as optical sensing devices. One example of such an IC uses a package having a light emitting diode (LED) and a photodetector in order to produce and detect light. More specifically, light may be produced by the LED and be reflected from the object back to the photodetector. The photodetector produces a representation (e.g., an electrical signal) of the detected light. The electrical signal or representation may be processed and used as desired to obtain information about the object. Sensing apparatus such as devices for proximity sensing, presence detection, motion detection, and color detection frequently use such optical sensing methods to obtain information about an object, such as a particular color of the object.

SUMMARY

This document describes an improved sensor system that includes a temperature controller for regulating a temperature of the system to improve a precision of spectral information measured by the sensor system. The sensor system includes an emitter that generates a first light wave and a detector that detects a second light wave in response to the first light wave being reflected from a target object. The sensor system includes a temperature analog-to-digital converter that obtains a first temperature measurement from a temperature sensor of the sensor system. The temperature measurement is obtained at least when the first light wave is generated or when the second light wave is detected. A temperature controller computes temperature coefficients to regulate a temperature of the sensor system. Each of the temperature coefficients are computed based on a difference between the first temperature and a reference temperature. The temperature controller generates a control signal to regulate the temperature of the sensor system based on the computed temperature coefficients.

One aspect of the subject matter described in this specification can be embodied in a method performed using a sensor system. The method includes: generating, by an emitter of the sensor system, a first light wave; detecting, by a detector of the sensor system, a second light wave in response to the first light wave being reflected from a target object; and obtaining, by a first converter and from one or more temperature sensors of the sensor system, a first temperature of the sensor system at least when the first light wave is generated by the emitter or when the second light wave is detected by the detector. The method further includes, computing, by a temperature controller, temperature coefficients to regulate a temperature of the sensor system, where each of the temperature coefficients is computed based on a difference between the first temperature and a reference temperature; and generating, by the temperature controller, a control signal to regulate the temperature of the sensor system based on the computed temperature coefficients.

Another aspect of the subject matter described in this specification can be embodied in a sensor system. The sensor system includes: an emitter operable to generate a first light wave; a detector operable to detect a second light wave in response to the first light wave being reflected from a target object; and at least one temperature sensor operable to determine a temperature measurement that indicates a particular temperature at a respective section of the sensor system. The sensor system further includes an analog-to-digital converter operable to obtain, from the one or more temperature sensors, a first temperature of the sensor system at least when the first light wave is generated by the emitter or when the second light wave is detected by the detector; and a temperature controller operable to: compute temperature coefficients to regulate a temperature of the sensor system, each of the temperature coefficients being computed based on a difference between the first temperature and a reference temperature; and generate a control signal to regulate the temperature of the sensor system based on the computed temperature coefficients.

Other implementations of this disclosure and other aspects include corresponding systems, apparatus, and computer programs configured to perform the actions of the methods and encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Other aspects, features and advantages will become apparent from the following detailed description, the accompanying drawings, and the claims.

DETAILED DESCRIPTION

Figure 1:
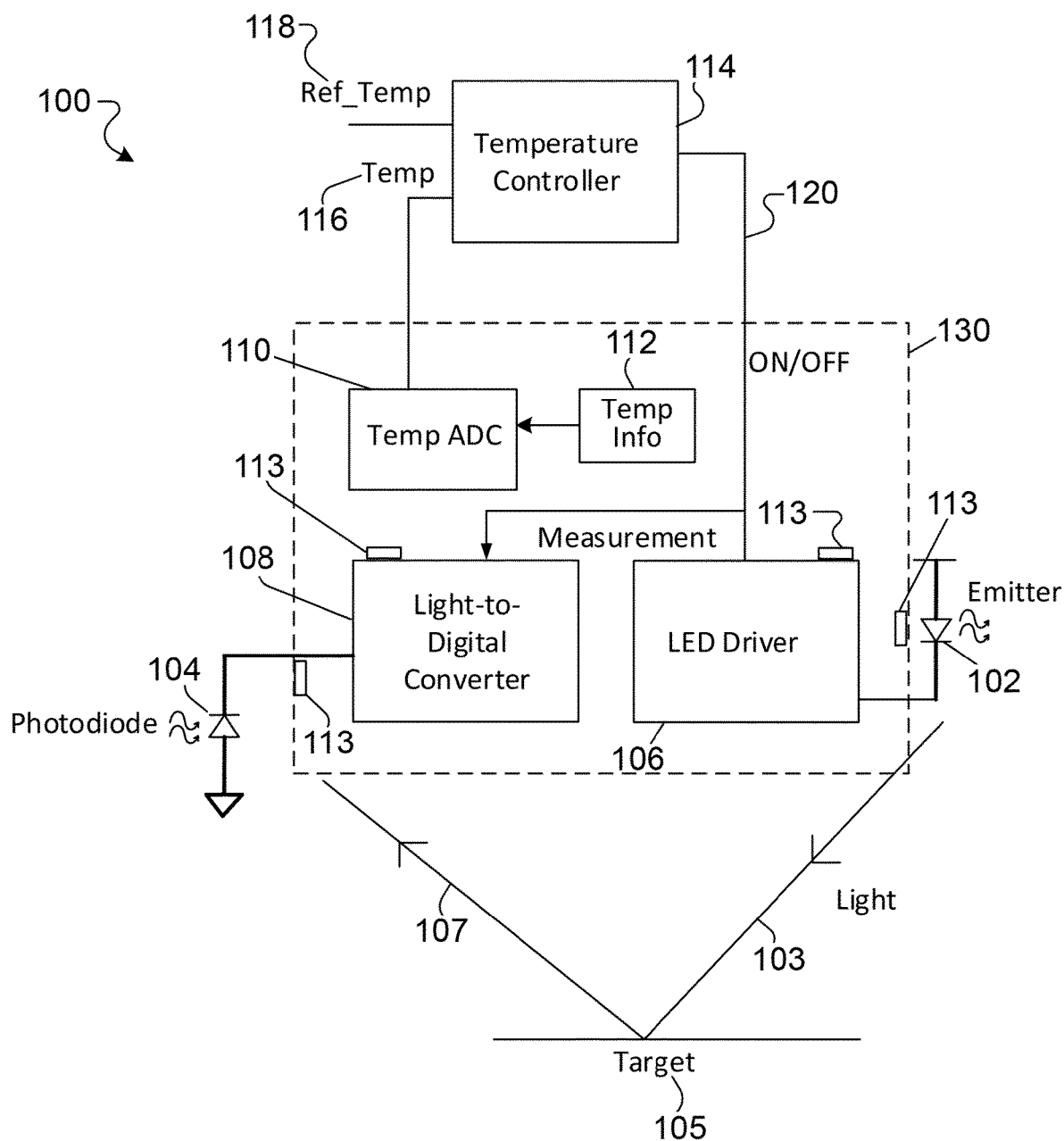
FIG. 1 is a block diagram of an example optical sensing system.

FIG. 1 is a block diagram of an example optical sensing system. System 100 can represent an integrated circuit (IC) or an optical device, such as one or multiple optical sensors or optical sensing devices. System 100 includes an emitter 102, such as a light emitting diode (LED), and a detector 104, such as a photodetector. In some cases, detector 102 is alternatively referred to as a sensor and may be a photodiode operable to sense (e.g., detect) light waves. Emitter 102 can be operable, for example, to generate a signal of a particular wavelength, and the detector 104 can be a sensor operable to sense the signal produced by the emitter 102.

The emitter 102 can be configured to produce visible or non-visible light of a desired wavelength. For example, the emitter 102 can produce light waves that have a wavelength in the infrared (IR) spectrum in the range of 850 nanometers (nm) to 940 nm. In some implementations, the light waves can have a wavelength that ranges from 300 nm to 1100 nm.

As described in more detail below, in an example implementation, the emitter 102 produces light that reflects off a target object and the detector 104 detects and processes the reflected light to obtain information about the target object, such as a color of the target object.

The emitter 102 can be fabricated directly onto an IC 130 of system 100 or may include an IC chip or other modular component that is added to the IC 130 of system 100 during or after fabrication of the IC. The emitter 102 may be a single emitter or may represent multiple emitters (e.g., an array of emitters). The detector 104 is configured to detect light of the wavelength produced by the emitter 102 (e.g., in the range of 850 nm to 940 nm). The detector 104 also may be fabricated directly onto an IC 130 of system 100 or may include an IC chip or other modular component that is added to the IC 130 of system 100 during or after fabrication of the IC. The detector 104 may be a single detector or may represent multiple detectors (e.g., an array of detectors).

System 100 further includes an LED driver 106, a light-to-digital converter 108 ("LDC 108"), a temperature analog-to-digital converter 110 ("temp ADC 110"), and a temperature controller 114. LED driver 106 is an example driver circuit that is operable to generate a drive signal that is received by emitter 102. For example, the drive signal is a command or control signal that causes the emitter 102 to generate a light wave 103. In some implementations, the emitter 102 is an LED that is operable to emit light for sensing information about an object and the detector 104 is a photodiode that is operable to detect photons that correspond to the light emitted by the LED when the emitted light reflects off the object.

In this context, the light wave 103 is used by the sensor system 100 to obtain information about a target object 105. For example, the light wave 103 interacts with the target object 105, e.g., by reflecting off the target object, to cause a reflected light wave 107. The reflected light wave 107 is received and processed by components of the sensor system 100. For example, the reflected light wave 107 carries spectral information about the target object 105 and the sensor system 100 processes this spectral information to obtain information about the target object 105. In some implementations, the information about the target object 105 that is obtained from the spectral information indicates a color of the target object 105 or physical characteristic or attribute of the target object 105.

In general, a measurement cycle of the sensor system 100 corresponds to LED driver 106 providing a drive signal to emitter 102 to cause the emitter 102 to generate (e.g., emit) light wave 103 and detector 104 detecting reflected light wave 107. During each measurement cycle of sensor system 100, the described components of the sensor system 100 generate heat that can affect a temperature of the sensor system. When the temperature of the sensor system 100 is left unregulated, the temperature can increase to a level that degrades the precision of the spectral information obtained from the reflected light wave 107. Hence, the techniques described in this document can be used to more efficiently regulate the temperature of the sensor system 100. For example, using the described techniques, the temperature of the sensor system 100 can be regulated with improved efficiency relative to conventional methods.

Referring again to sensor system 100, the LDC 108 is operable to receive and process a parameter signal representing the reflected light wave 107 that is received by detector 104. For example, the LDC 108 is configured to process the parameter signal by converting the signal, and a corresponding parameter value of the signal, to a digital signal having a corresponding binary value. The converted digital signal is processed by the sensor system 100 to extract or obtain spectral information about the target object 105.

Temp ADC 110 is an example analog-to-digital converter that is operable to receive analog signals representing temperature information 112. The received analogs signals correspond to temperature measurements and are converted to digital signals that each represent a measured temperature at sensor system 100. For example, temperature information 112 includes respective temperature measurements obtained from different temperature sensors 113 ("temp sensors 113") integrated at the sensor system 100. Temp ADC 110 obtains respective temperature measurements, e.g., via temperature information 112, from each of the one or more temp sensors 113. The temp ADC 110 can obtain the respective temperature measurements when the light wave 103 is generated by the emitter 102, when the reflected light wave 107 is detected by the detector 104, or both. The temp sensors 113 can include thermocouples, resistance temperature detectors (RTDs), or a combination of each. Other devices for measuring temperatures in a circuit are also within the scope of this specification.

Temp sensors 113 are each operable to sense a temperature associated with various electronic devices installed at the sensor system 100. The temp sensors 113 can be positioned at various locations in the sensor system 100 to sense the temperature of any device in a circuit of the sensor system 100 that is a conductor of current. For example, the temp sensors 113 can sense the temperature of a complementary metal-oxide semiconductor (CMOS) chip that is installed at the IC 130 to provide signal processing and logic functions of sensor system 100. In the implementation of FIG. 1, the temp sensors 113 are placed at least at locations and along signal paths where light wave 103 is emitted and signals representing reflected light wave 107 are received and converted to digital signals for processing at the sensor system 100. Such signal paths can include locations that are adjacent emitter 102 and detector 104.

In general, each device in a circuit of the sensor system 100 that conducts current may also generate heat which can affect a temperature of the sensor system. As noted above, if the temperature of the sensor system 100 is left unregulated, the temperature can increase to a level that degrades the precision of spectral information obtained from the reflected light wave 107. Temperature information 112 can include one or more analog voltage signals generated by temp sensors 113. In some implementations, the temp ADC 110 cooperates with one or more temp sensors 113 to measure a delta voltage, $V_{BE}$, of a diode or CMOS device integrated in a circuit of the sensor system 100. In some cases, measuring a diode or device voltage corresponds to measuring a junction temperature at an example integrated circuit of sensor system 100.

For example, because the temperature of a diode (or other device) can change based on the voltage, measuring the delta voltage can include measuring a change in the voltage VBE over temperature. For one or more devices and under constant current, the voltage VBE versus temperature can represent a well-controlled relationship, e.g., where a 2.2 millivolt (mV) change in measured voltage corresponds to one kelvin unit of temperature or one degree Celsius. Hence, the temp ADC 110 interacts with the temp sensors 113 to obtain and convert analog measurement data for conductor device voltage characteristics (e.g., a diode voltage) over temperature. In some implementations, the temp sensors 113 determine temperature measurements of various devices in a measurement channel of the sensor system 100 and the temp ADC 110 determines corresponding shift values that are applied to the temperature measurements to regulate the temperature of the measurement channel.

Temperature controller 114 is configured to regulate an overall temperature of the sensor system 100. For example, the temperature controller 114 regulates the overall temperature of the sensor system 100 by regulating a respective temperature of one or more junctions at the sensor system 100. In some implementations, the temperature controller 114 controls and regulates temperatures at the sensor system 100, without extensive operator or user involvement.

As described in more detail below, temperature controller 114 computes temperature coefficients to regulate junction temperatures of the sensor system 100. The temperature controller 114 computes each of the temperature coefficients based on a computed difference between a measured temperature 116 and a reference temperature 118. The reference temperature 118 represents an example temperature set point or desired control temperature. The temperature set point can be used to achieve a desired level of precision when spectral information carried by reflected light wave 107 is extracted for analysis at the sensor system 100.

The temperature controller 114 includes an example proportional-integral-derivative (PID) controller (e.g., a microcontroller) that is used to compute the temperature coefficients. The PID controller provides a control loop feedback mechanism that enables continuous control (or continuously modulated control) based on multiple continuous temperature measurements. In some implementations, the multiple continuous temperature measurements can occur sequentially at the sensor system 100.

The PID control scheme is a control algorithm that has three basic coefficients: a proportional, an integral, and a derivative. Each coefficient can be varied by the temperature controller 114 to obtain an optimal temperature response. In some implementations, the temperature controller 114 interacts with the sensor system 100 by using the PID controller to form a temperature regulation control loop. The temperature regulation control loop is operable to enable the temperature controller 114 to regulate the temperature of the sensor system 100 to a referent level.

To achieve a more fine-tuned regulation of the overall temperature of the sensor system 100, the temperature controller 114 can compute a respective set of temperature coefficients for each measurement channel of the sensor system 100. The temperature controller 114 computes the respective sets of coefficients in response to comparing an actual measured temperature 116 to a particular reference temperature 118 that is associated with a particular measurement channel. In some implementations, the reference temperature 118 represents a desired control temperature that is specific to one or more measurement channels of the sensor system 100.

For example, components of a given measurement channel can have their own temperature coefficients. Hence, temperature controller 114 can generate a respective set of temperature coefficients for a given measurement channel based on a separate temperature value for each component in the measurement channel. In this manner, the temperature controller 114 can be used to achieve a more fine-tuned regulation of the overall temperature of the sensor system 100 by generating control signals 120 to regulate specific temperatures at respective measurement channels of the sensor system 100.

The temperature controller 114 includes an output that is connected (e.g., coupled) to LED driver 106 for controlling an off-time of the LED driver 106. This output provides a signal path supplying the control signal 120 for temperature regulation in the sensor system 100. For example, the temperature controller 114 generates a control signal 120 to regulate the temperature of the sensor system based on the computed temperature coefficients. In some implementations, the output of the temperature controller 114, e.g., control signal 120, controls the off-time of the LED driver 106 and emitter 102 while another device of sensor system 100 controls the on-time of the LED driver 106 and emitter 102. In other implementations, the control signal 120 generated by the temperature controller 114 is used to control both the on-time and off-time of the LED driver 106 as well as to control both the on-time and off-time of the emitter 102.

In some implementations, the temperature controller 114 is operable to apply calibration logic based on the computed temperature coefficients to eliminate or substantially mitigate temperature effects at sensor system 100 that degrade the precision or quality of the extracted spectral information carried by the reflected light wave 107. In other implementations, the temperature controller 114 determines a delta temperature in response to comparing the measured temperature 116 with the reference temperature 118 over a predefined set of temperature measurements. The delta temperatures that are determined over this predefined set of temperature measurements are used to compute the temperature coefficients.

Based on the computed temperature coefficients, the temperature controller 114 generates the control signal 120 to adjust an amount of delay between respective measurement cycles of the sensor system 100. For example, the temperature controller 114 adjusts the amount of delay between respective measurement cycles and regulates the temperature of the sensor system 100 by, for example, controlling an off-time of a driver circuit (LED driver 106) that causes the emitter 102 to generate the light wave 103. This adjustment regulates the temperature of the sensor system 100 by reducing an amount of heat that is produced at the system by the LED driver 106 and other components of the sensor system 100.

For purposes of example, sensor system 100 is described in the context of an object attribute sensing application. However, emitter 102 and detector 104 may be used for other applications, including presence detection, motion detection, color detection, and other related applications in which an emitted signal is later detected and processed or analyzed to obtain information about an object. In the implementation of FIG. 1, the sensor system 100 is an optical device that emits a light signal to sense information about target object 105. For example, the target object 105 can be a physical item, such as an apple, and the reflected light wave 107 is processed by the sensor system 100 to determine an attribute of the physical item, such as a color, ripeness, or freshness of the apple.

Figure 2:
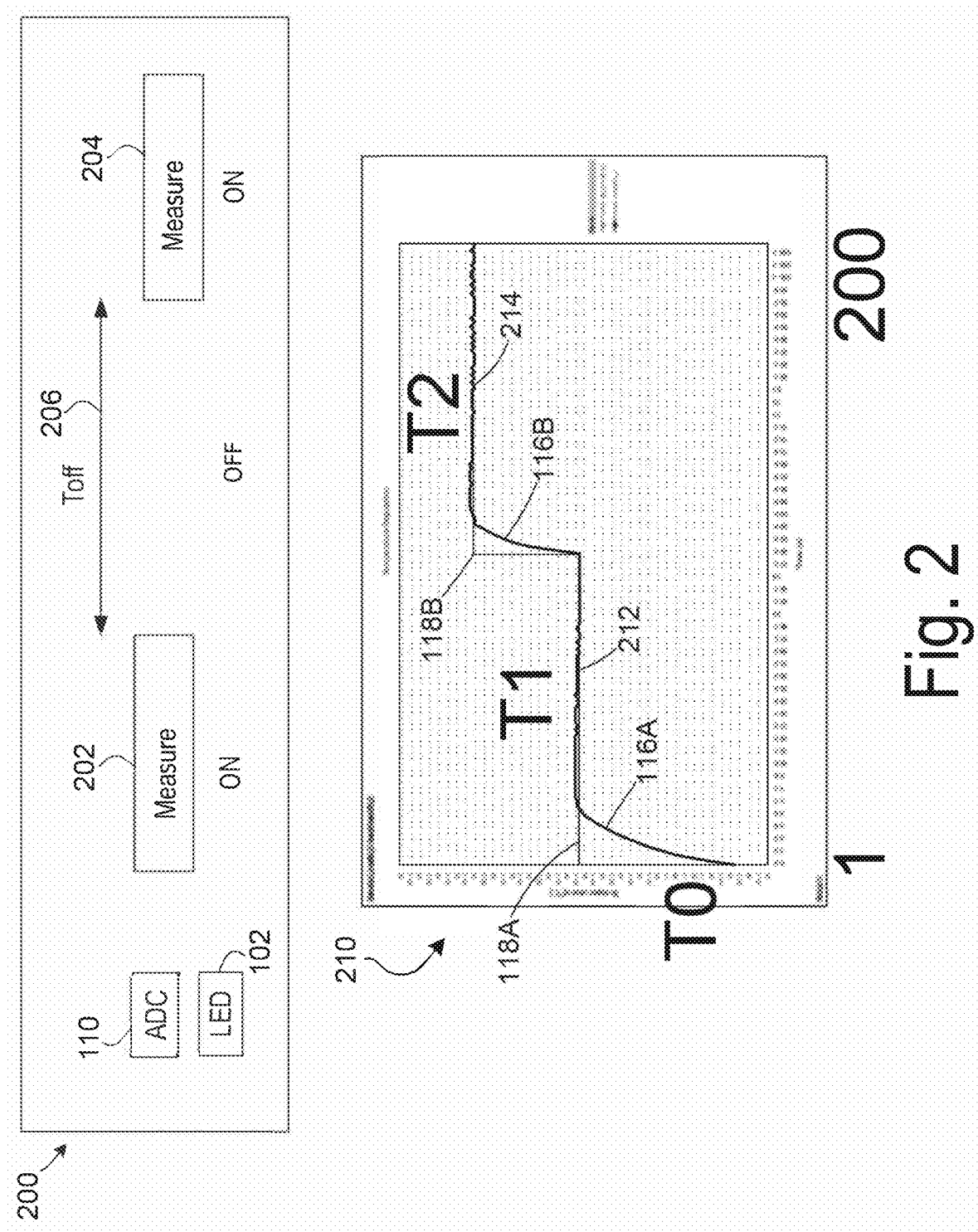
FIG. 2 is a block diagram that includes information associated with temperature measurements in an optical sensing system.

FIG. 2 is a block diagram that includes information associated with temperature measurements in an optical sensing system 100. In an example measurement cycle 200, control signal 120 causes LED driver 106 to be powered "ON," to provide a drive signal to emitter 102, while temp ADC 110 is operable to concurrently "measure" (202) temperatures of circuit devices in the sensor system 100. The temp ADC 110 is used to measure the temperatures by converting analog voltage signals of temperature information 112 to digital signals that represent measured temperature 116. The measurement cycle 200 includes the LED driver 106 transitioning from being powered ON to being powered "OFF" such that no drive signal is provided to emitter 102 and no concurrent temperature measurements are converted by temp ADC 110. The measurement cycle 200 resumes when the control signal 120 again causes LED driver 106 to be powered "ON," and temp ADC 110 is used to concurrently "measure" (204) temperatures of devices integrated at the circuit.

An amount of time that the LED driver 106 is powered OFF is represented by an example parameter off-time, $T_{OFF}$, 206 ("$T_{OFF}$ 206"). As described above, the measured temperature 116 is received at an input of the temperature controller 114 and is compared to the reference temperature 118 to compute the temperature coefficients. The temperature controller 114 uses the computed temperature coefficients to adjust an off-time, $T_{OFF}$, 206 between measurement cycles 200. The temperature controller 114 is operable to regulate the temperature of the sensor system 100 to a referent level by adjusting a delay time-off, $T_{OFF}$ 206, between respective measurement cycles 200. In some cases, the delay time-off is adjusted by increasing or decreasing an amount of time that the LED driver 106 is powered OFF.

For example, if the reference temperature 118 (e.g., 43° C.) is much larger than the measured temperature 116 (e.g., 18° C.) then the $T_{OFF}$ 206 is small (e.g., $T_{OFF}$=2 ms) and temperature measurements can be obtained fairly rapidly in small time intervals. Conversely, if the reference temperature 118 (e.g., 43° C.) is close to, or even smaller than, the measured temperature 116 (e.g., 41° C.) then the $T_{OFF}$ 206 can be larger (e.g., $T_{OFF}$=50 ms) and temperature measurements can be obtained less frequently and at larger time intervals.

In some implementations, when the reference temperature 118 is much larger than the measured temperature 116 and $T_{OFF}$ 206 is small, the rapid measurement intervals occur until the measured temperature 116 reaches the reference temperature 118. When the measured temperature 116 reaches the reference temperature 118, this corresponds to temperature equilibrium in the sensor system 100 or temperature equilibrium in an example measurement channel of the sensor system 100. The temperature controller 114 adjusts the delay time-off to obtain temperature equilibrium and stabilize an example feedback control loop of the IC 130.

Graphical data 210 shows various temperature measurements that are analyzed by the temperature controller 114 as the sensor system 100 approaches respective temperature equilibriums 212 and 214. In some implementations, for an example measurement channel_A, measured temperatures 116A are compared to a reference temperature 118A until the temperature of the measurement channel_A approaches temperature equilibrium 212. Similarly, for an example measurement channel_B, measured temperatures 116B are compared to a reference temperature 118B until the temperature of the measurement channel_B approaches temperature equilibrium 214. In some cases, the reference temperature 118 is a constant reference temperature or a dynamic reference temperature. Dynamic reference temperatures may be determined by a temperature ramp function or a temperature step function.

In some implementations, large numbers of continuous measurements (e.g., 200 measurements) may not be available to sufficiently regulate a measurement channel_A, which can lead to a temperature dependency for the channel. In this case, a temperature dependency of the measurement channel_A for each measurement iteration can be compensated by sensing a temperature, T, and applying equation: $A\_comp = A*(1-TC(T-T0))$, where TC is previously estimated and T0 is a nominal temperature. This nominal temperature can be obtained using equation, $T0=(T1+T2)/2$). It should be noted that this equation is valid for the temperature range until temperature dependency stays linear. In the case of nonlinear behavior between T1 and T2, additional temperature points and higher level of approximation (for example parabolic) could be used.

Figure 3:
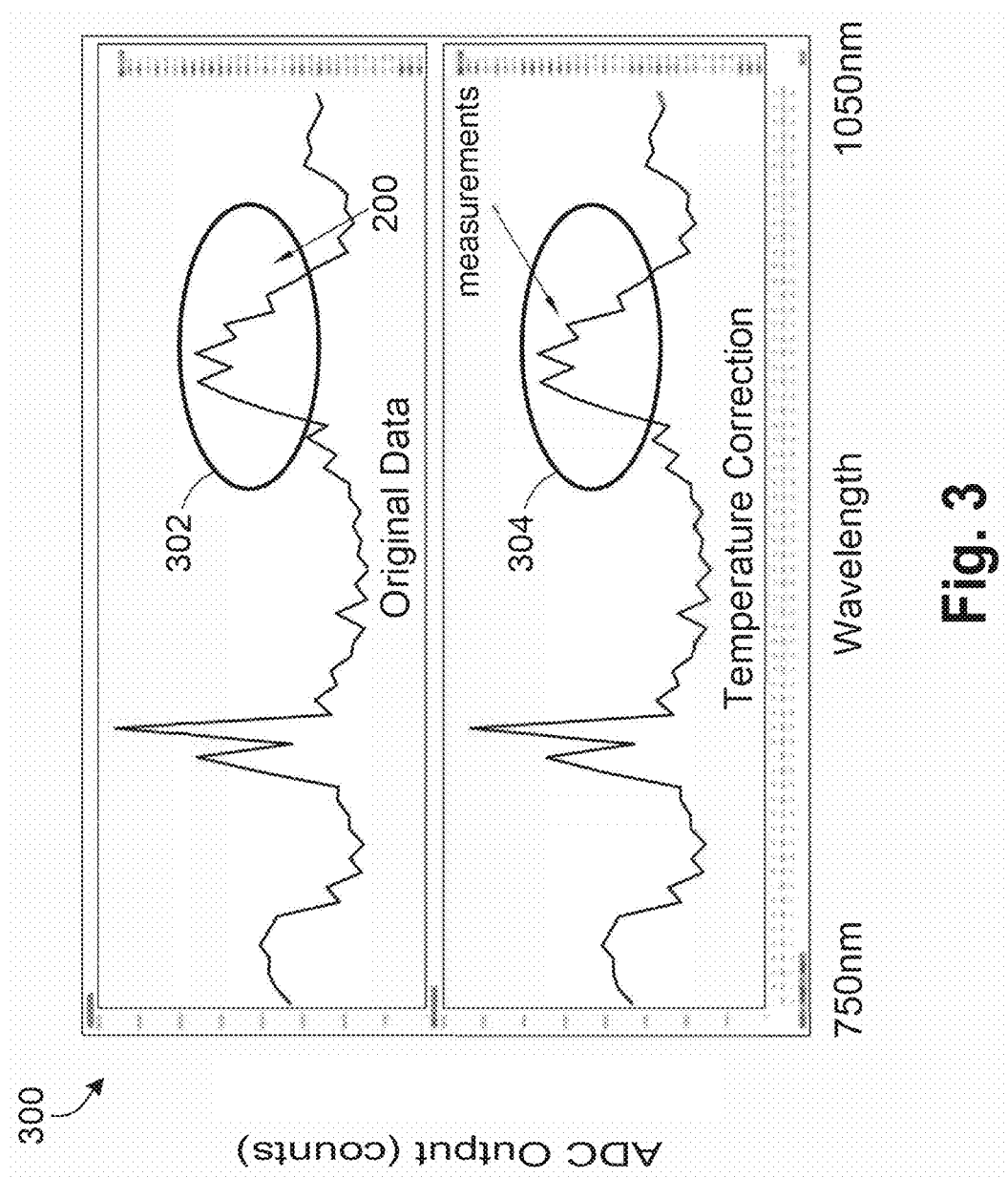
FIG. 3 shows graphical data about original and corrected temperature measurements in an optical sensing system.

FIG. 3 shows graphical data about original temperature measurements 302 and corrected temperature measurements 304 in an example optical sensing system. Original temperature measurements 302 include visible noise components that occur when the temperature of a sensor system is unregulated. As noted above, when the temperature of a sensor system is left unregulated, the temperature can increase to a level that degrades the accuracy of extracted spectral information obtained from the reflected light wave 107 that indicates physical characteristics of target object 105. In contrast, corrected temperature measurements 304 are obtained in the sensing system 100 using the techniques described in this document.

The corrected temperature measurements 304 do not include visible noise components because the temperature of sensor system 100 is regulated based on the temperature coefficients computed using the temperature controller 114. Hence, there is no degradation in the accuracy of extracted spectral information obtained from the reflected light wave 107 that indicates physical characteristics of target object 105.

Figure 4:
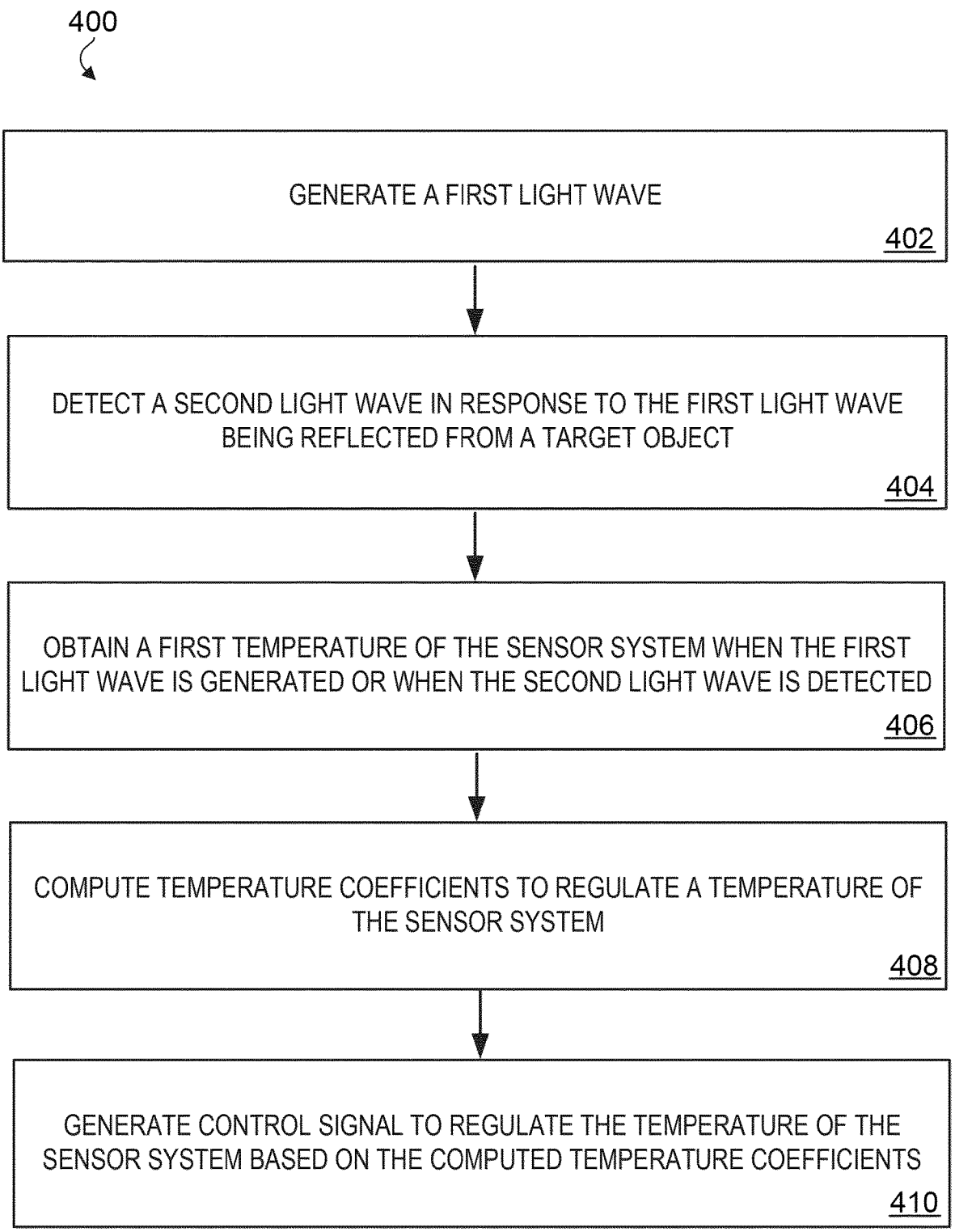
FIG. 4 shows an example process for regulating temperature of an optical sensing system.

FIG. 4 shows an example process 400 for regulating temperature of an optical sensing. Process 400 is performed using the components of system 100 described above. Referring now to the process 400, an emitter of a sensor system generates a first light wave (402). For example, the emitter 102 can be an LED that emits light wave 103 to allow the sensor system 100 to sense information about a target object 105. In some implementations, the target object 105 is a physical item such as a fruit or a meat product and the sensed information indicates whether the fruit or meat product is fresh enough for human consumption.

A detector of the sensor system detects a second light wave in response to the first light wave being reflected from a target object (404). For example, the detector 104 can be a photodiode that detects photons of the reflected light wave 107. The light wave 103 emitted by emitter 102 interacts with the target object 105 to cause the reflected light wave 107 that is detected by the detector 104. The target object 105 is external to the sensor system 100. In this manner, the emitted light wave 103 exits an optical device, e.g., an emitter/LED 102, of the sensor system 100 after being emitted for sensing the information about the target object 105. The reflected light wave 107 is received at the detector 104 in response to the emitted light wave 103 interacting with the target object 105. The reflected light wave 107 carries spectral information indicating physical attributes of the target object 105. The detector 104 generates a parameter signal that is processed at the sensor system 100 to obtain information about the physical attributes of the target object 105.

A converter of the sensor system obtains a temperature measurement from one or more temperature sensors of the sensor system (406). The converter can be part of an integrated circuit 130 included in the sensor system 100 and the temperature measurement provides a current temperature of the sensor system 100. The converter can be a temperature analog-to-digital converter configured to obtain the temperature measurement when the first light wave is generated by the emitter or when the second light wave is detected by the detector. For example, the temp ADC 110 is configured to obtain respective temperature measurements, e.g., via temperature information 112, from each of the one or more temp sensors 113. The temp ADC 110 can obtain the respective temperature measurements when the light wave 103 is generated by the emitter 102 or when the reflected light wave 107 is detected by the detector 104.

A temperature controller included in the sensor system computes temperature coefficients to regulate a temperature of the sensor system (408). Each temperature coefficient is computed based on a difference between the first temperature and a reference temperature of the temperature controller. The temperature controller generate a control signal to regulate the temperature of the sensor system based on the computed temperature coefficients (410). For example, the temperature controller 114 is operable to generate a control signal 120 to control LED driver 106 and the light emitted by emitter 102. In some implementations, the control signal 120 is used by sensor system 100 to control an on-time and an off-time of the LED driver 106 as well as a corresponding on-time and off-time of the emitter 102.

To control the LED driver 106 and emitter 102, the temperature controller 114 is configured to generate a control signal 120 that has a constant pulse width. In at least one alternative implementation, to control the LED driver 106 and emitter 102, the temperature controller 114 can be configured to use a control signal 120 that has a modulated pulse width. In some implementations, the temperature controller 114 is operable to regulate the temperature of the sensor system 110 by controlling an off-time of the LED driver circuit 106 to reduce an amount of heat that is produced when the LED driver circuit causes the emitter 102 to generate the light wave 103. Using the temperature controller 114 to reduce the amount of heat that is produced corresponds to a noted advantage of the described sensor system 100 that contributes to improving the quality and accuracy of spectral information extracted from the reflected light wave 107.

In some implementations, the sensing system 100 is installed in a host device, such as a mobile smartphone, tablet, in-ear headphones, wearable devices, or other electronic device. In such implementations, the advantages of described techniques pertain to regulating the temperature of the sensor system 100 to enhance a precision of the spectral information obtained by the system 100. This enhanced precision can translate to improved attribute or proximity sensing features as well as other detection features at the host device. For example, the sensing system 100 may be integrated in a host device, and the reflected light wave 107 is processed at the host device to more accurately determine whether the host device is positioned at an ear of a person's head or to more accurately determine whether a piece of meat is sufficiently fresh for human consumption.

In some examples, the host device receives signals from the detector 104 and uses one or more processing devices to adjust a feature of the host device in response to analyzing the parameter signals generated by, and received from, the detector 104. For example, the host device can adjust a brightness of a display screen integrated at the host device, turn off the display screen, or generate a notification that is viewable at the display screen and that indicates or describes physical attributes of the target object 105 that were sensed by the sensor system 100.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. In some implementations, the computer programs are used by a controller of a host device (e.g., a smartphone or tablet). For example, the controller uses the programs to control operation of an emitter disposed in the host device and to process signals generated by a detector disposed in the host device. The signals generated by the detector are processed in response to the detector receiving reflected light corresponding to light waves emitted by the emitter.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Further, while this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Accordingly, other implementations are within the scope of the following claims.

What is claimed is:

1. A method performed using a sensor system, the method comprising:
   generating, by an emitter of the sensor system, a first light wave;
   detecting, by a detector of the sensor system, a second light wave in response to the first light wave being reflected from a target object;
   obtaining, by a first converter and from one or more temperature sensors of the sensor system, a first temperature of the sensor system at least when the first light wave is generated by the emitter or when the second light wave is detected by the detector;
   computing, by a temperature controller, temperature coefficients to regulate a temperature of the sensor system, where each of the temperature coefficients is computed based on a difference between the first temperature and a reference temperature;
   generating, by the temperature controller, a control signal to regulate the temperature of the sensor system based on the computed temperature coefficients; and
   regulating, by the temperature controller, the temperature of the sensor system by controlling an off-time of a driver circuit that causes the emitter to generate the first light wave,
   wherein increasing the off-time of the driver circuit cools the detector and the emitter.

2. The method of claim 1, wherein the sensor system includes multiple channels and computing the temperature coefficients comprises:
   computing respective sets of temperature coefficients for each channel based on the difference between the first temperature and the reference temperature.

3. The method of claim 2, wherein generating the control signal comprises:
   generating the control signal to regulate a respective temperature for each channel of the multiple channels included in the sensor system based on the respective sets of temperature coefficients for each channel.

4. The method of claim 1, further comprising:
   regulating, by the temperature controller, the temperature of the sensor system based on each of the computed temperature coefficients.

5. The method of claim 1, wherein computing the temperature coefficients comprises:
   computing one or more temperature coefficients in response to determining that the first temperature corresponds to an equilibrium state of the sensor system.

6. The method of claim 1, wherein:
   the temperature controller interacts with the sensor system to form a temperature regulation control loop; and
   the temperature regulation control loop is operable to enable the temperature controller to regulate the temperature of the sensor system to a referent level.

7. The method of claim 1, wherein:
   the second light wave carries spectral information that indicates a physical characteristic of the target object; and
   precision of the spectral information that indicates the physical characteristic of the target object is degraded when the temperature of the sensor system is unregulated.

8. The method of claim 7, further comprising:
   regulating, by the temperature controller, the temperature of the sensor system to enhance the precision of the spectral information about the target object relative,
   wherein the precision of the spectral information is enhanced relative to when the temperature of the sensor system is unregulated.

9. A sensor system comprising:
   one or more processing devices; and
   one or more non-transitory machine-readable storage devices storing instructions that are executable by the one or more processing devices to cause performance of operations comprising:
   generating, by an emitter of the sensor system, a first light wave;
   detecting, by a detector of the sensor system, a second light wave in response to the first light wave being reflected from a target object;
   obtaining, by a first converter and from one or more temperature sensors of the sensor system, a first temperature of the sensor system at least when the first light wave is generated by the emitter or when the second light wave is detected by the detector;
   computing, by a temperature controller, temperature coefficients to regulate a temperature of the sensor system, where each of the temperature coefficients is computed based on a difference between the first temperature and a reference temperature;
   generating, by the temperature controller, a control signal to regulate the temperature of the sensor system based on the computed temperature coefficients; and
   regulating, by the temperature controller, the temperature of the sensor system by controlling an off-time of a driver circuit that causes the emitter to generate the first light wave,
   wherein increasing the off-time of the driver circuit cools the detector and the emitter.

10. The sensor system of claim 9, wherein the sensor system includes multiple channels and computing the temperature coefficients comprises:

computing respective sets of temperature coefficients for each channel based on the difference between the first temperature and the reference temperature.

11. The sensor system of claim 10, wherein generating the control signal comprises:
generating the control signal to regulate a respective temperature for each channel of the multiple channels included in the sensor system based on the respective sets of temperature coefficients for each channel.

12. The sensor system of claim 9, wherein the operations further comprise:
regulating, by the temperature controller, the temperature of the sensor system based on each of the computed temperature coefficients.

13. The sensor system of claim 9, wherein computing the temperature coefficients comprises:
computing one or more temperature coefficients in response to determining that the first temperature corresponds to an equilibrium state of the sensor system.

14. The sensor system of claim 9, wherein:
the temperature controller interacts with the sensor system to form a temperature regulation control loop; and
the temperature regulation control loop is operable to enable the temperature controller to regulate the temperature of the sensor system to a referent level.

15. The sensor system of claim 9, wherein:
the second light wave carries spectral information that indicates a physical characteristic of the target object; and
precision of the spectral information that indicates the physical characteristic of the target object is degraded when the temperature of the sensor system is unregulated.

16. The sensor system of claim 15, wherein the operations further comprise:
regulating, by the temperature controller, the temperature of the sensor system to enhance the precision of the spectral information about the target object relative,
wherein the precision of the spectral information is enhanced relative to when the temperature of the sensor system is unregulated.

17. A sensor system comprising:
an emitter operable to generate a first light wave;
a detector operable to detect a second light wave in response to the first light wave being reflected from a target object;
at least one temperature sensor operable to determine a temperature measurement that indicates a particular temperature at a respective section of the sensor system;
an analog-to-digital converter operable to obtain, from the one or more temperature sensors, a first temperature of the sensor system at least when the first light wave is generated by the emitter or when the second light wave is detected by the detector; and
a temperature controller operable to:
compute temperature coefficients to regulate a temperature of the sensor system, each of the temperature coefficients being computed based on a difference between the first temperature and a reference temperature;
generate a control signal to regulate the temperature of the sensor system based on the computed temperature coefficients; and
regulate, by the temperature controller, the temperature of the sensor system by controlling an off-time of a driver circuit that causes the emitter to generate the first light wave,
wherein increasing the off-time of the driver circuit cools the detector and the emitter.

18. The sensor system of claim 17, further comprising:
a driver circuit that causes the emitter to generate the first light wave, and
wherein the temperature controller is operable to regulate the temperature of the sensor system by controlling an off-time of the driver circuit to reduce an amount of heat that is produced when the driver circuit causes the emitter to generate the first light wave.

\* \* \* \* \*